United States Patent [19]

Darling et al.

[11] 4,398,888

[45] Aug. 16, 1983

[54] MOLECULAR MODEL FOR CHEMISTRY

[75] Inventors: Stephen D. Darling; Aloysius A. Jendrisak, both of Silver Lake; David J. Bokmiller, Akron, all of Ohio

[73] Assignee: Tacoma Products, Inc., Tallmadge, Ohio

[21] Appl. No.: 320,615

[22] Filed: Nov. 12, 1981

Related U.S. Application Data

[62] Division of Ser. No. 110,363, Jan. 8, 1980, Pat. No. 4,325,698.

[51] Int. Cl.³ .................................... G09B 23/26
[52] U.S. Cl. .................................. 434/278; 46/28
[58] Field of Search ............. 46/25, 30, 31; 434/277, 434/278, 279, 280

[56] References Cited

U.S. PATENT DOCUMENTS 3,284,926 11/1966 Godfrey .......................... 434/278
3,991,511 11/1976 McAllister ...................... 46/30 X Primary Examiner—Harland S. Skogquist
Attorney, Agent, or Firm—James A. Hudak

[57] ABSTRACT

A molecular model building set for the formation of models of molecules and compounds primarily in the field of organic chemistry is disclosed. The set includes dimensionally accurate model building members (10, 60) that are rotatable about their axes, and can be interconnected and/or interlocked to form specific molecular models. Model building members depicting a double molecular bond (80) and a triple molecular bond (90) are also provided and can be interconnected and/or interlocked with the model building members (10, 60). All of the aforementioned model building members (10, 60, 80 and 90) are formed from a polypropylene copolymer material resulting in the members being inherently flexible while retaining sufficient rigidity to depict strain in molecular bonding. Because of this flexibility, the rotatability of the members, and the manner in which the members can be interconnected and/or interlocked, models of all known molecules and compounds in the field of organic chemistry can be formed.

1 Claim, 14 Drawing Figures

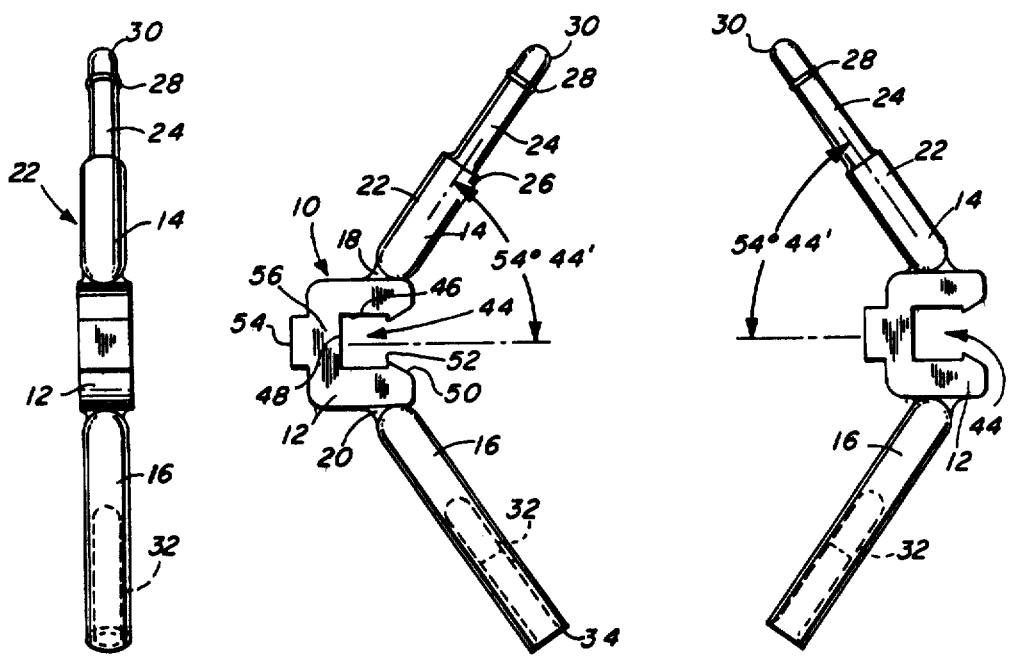
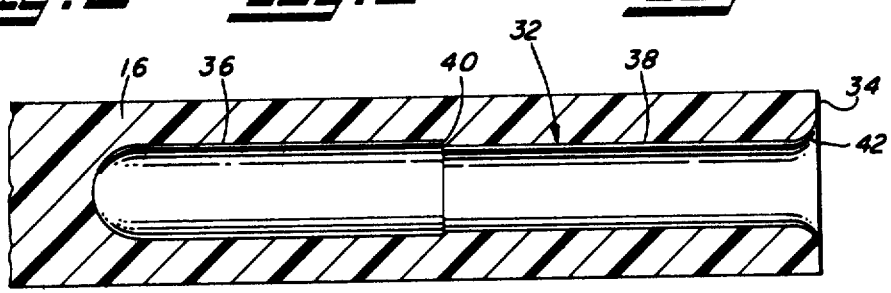
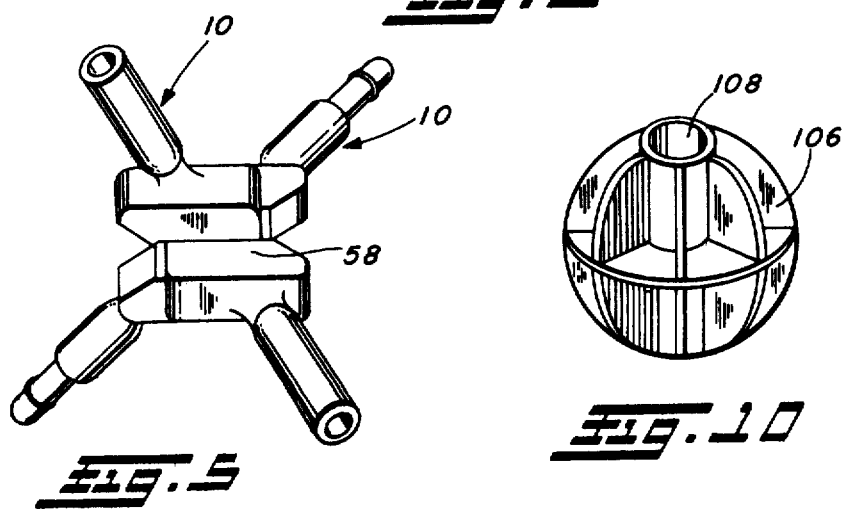

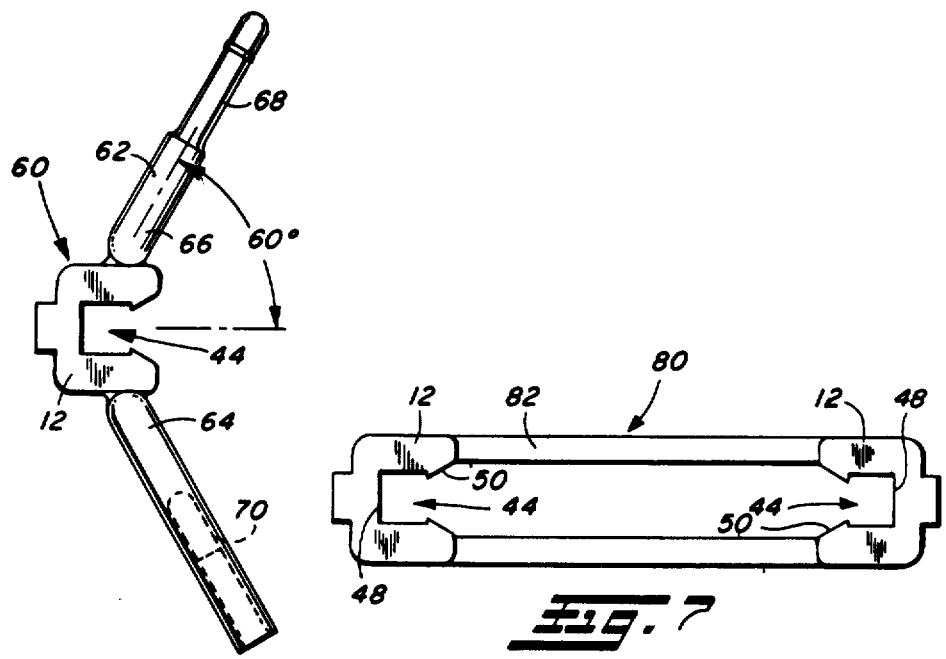
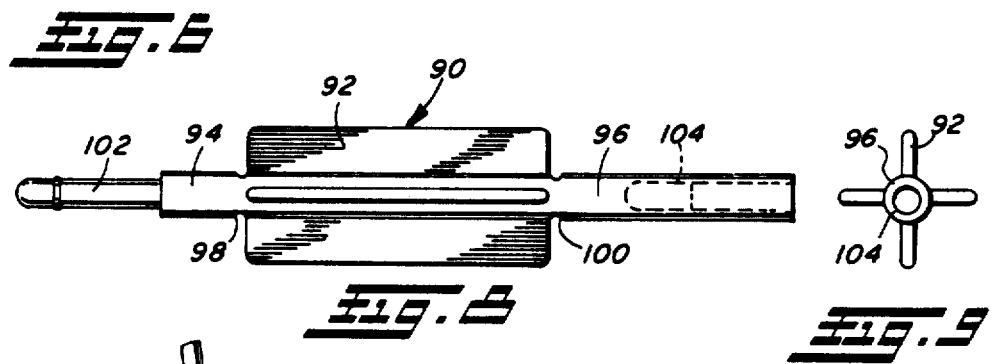
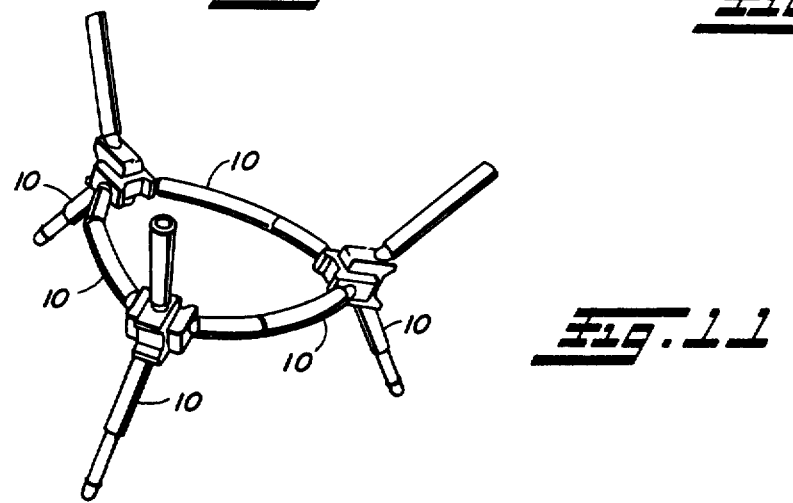

MOLECULAR MODEL FOR CHEMISTRY

This is a division of Ser. No. 110,363 filed Jan. 8, 1980, now U.S. Pat. No. 4,325,698.

TECHNICAL FIELD

The present invention relates generally to molecular models, and more particularly to molecular models that are utilized to depict molecules and compounds in the field of organic chemistry.

BACKGROUND ART

Because of the complex nature of many chemical molecules and compounds, it is desirable to graphically illustrate the spatial relationship between the atoms therein and the type of bonding therebetween. This is particularly true in the field of organic chemistry where the molecules and compounds are very complex with respect to structure, configuration, and spatial relationship of atoms comprising same. Many different types of molecular model building sets have become available to assist in the visualization of the structure of molecules and compounds in the field of organic chemistry, however, each of these sets has some inherent disadvantages. For example, the Dreiding model building set disclosed in U.S. Pat. No. 2,974,425 is comprised of a large number of different model building components. Since the components are formed from machined steel they are inflexible and thus models of certain molecules and compounds cannot be constructed therefrom. In addition, inasmuch as machined steel is utilized, the overall cost of the set is quite high and cannot be afforded by students and the like.

The Mathus model building set as disclosed in U.S. Pat. No. 3,230,643 utilizes a combination of plastic parts for the atoms and metal tubing for the bonds. This set requires the gluing of the plastic parts which comprise the atoms. Since the bonds are represented by metal tubing, the resulting molecular model members are relatively inflexible which result in the fracturing of these members across the glue line when the metal tubing is stressed. In addition, because of this inflexibility, the models of a number of different organic molecules and compounds, such as those requiring less than a five member ring, cannot be formed.

The Brumlik model building set as disclosed in U.S. Pat. No. 3,333,349 includes a large number of different components and utilizes tubing to connect same. Since the user must cut the tubing for his own needs, it is very possible that incorrect lengths will be cut which will result in the formation of a model of a molecule or compound with an incorrect spatial relationship between the atoms. In this case, dimensional accuracy between atoms would not exist and the resulting molecule or compound may be impossible of actual existence.

Because of this, it has become desirable to develop a low cost molecular model building set that utilizes a minimum number of flexible members that are dimensionally accurate and which can be interconnected and/or interlocked to form models of organic molecules and compounds.

SUMMARY OF THE INVENTION

The present invention solves the aforementioned problems associated with the prior art as well as other problems by providing dimensionally accurate rotatable model building members that can be interconnected and/or interlocked to form models of all known molecules and compounds in the field of organic chemistry. The model building members are injection molded from a polypropylene copolymer and thus are sufficiently flexible to form all of the aforementioned models, and yet retain enough rigidity to resist bending and twisting and thus can depict strain in molecular bonding. Because of this flexibility and the rotatability of the members about their axial axes, a minimum number of different model members is required to form models of these molecules and compounds. Since the model members are injection molded from a low cost material, the resulting model building set is readily affordable by students and the like.

BRIEF DESCRIPTION OF THE DRAWINGS

FIG. 1 is a front plan view of the first molecular model member of the invention and which represents an $sp^3$ hybrid orbital.

FIG. 2 is an end view of the molecular model member illustrated in FIG. 1.

FIG. 3 is a front plan view of an alternate embodiment of the molecular model member illustrated in FIG. 1.

FIG. 4 is an enlarged partial cross-sectional view of one of the arms of the molecular model member of FIG. 1 and illustrates the blind bore provided therein.

FIG. 5 is a perspective view of two of the molecular model members of FIG. 1 illustrating the interlocking relationship therebetween when the molecule being depicted has a tetrahedral configuration.

FIG. 6 is a front plan view of the second molecular model member of the invention and which represents an $sp^2$ hybrid orbital.

FIG. 7 is a front plan view of the third molecular model member of the invention and which represents a double bond.

FIG. 8 is a front plan view of the fourth molecular model member of the invention and which represents a triple bond.

FIG. 9 is an end view of the molecular model member of FIG. 8.

FIG. 10 is a perspective view of a marker ball used to mark atoms within a model constructed with molecular model members of the invention.

FIG. 11 is a perspective view of a three member ring consisting of interconnected $sp^3$ model members.

DESCRIPTION OF THE PREFERRED EMBODIMENT

Figure 12:
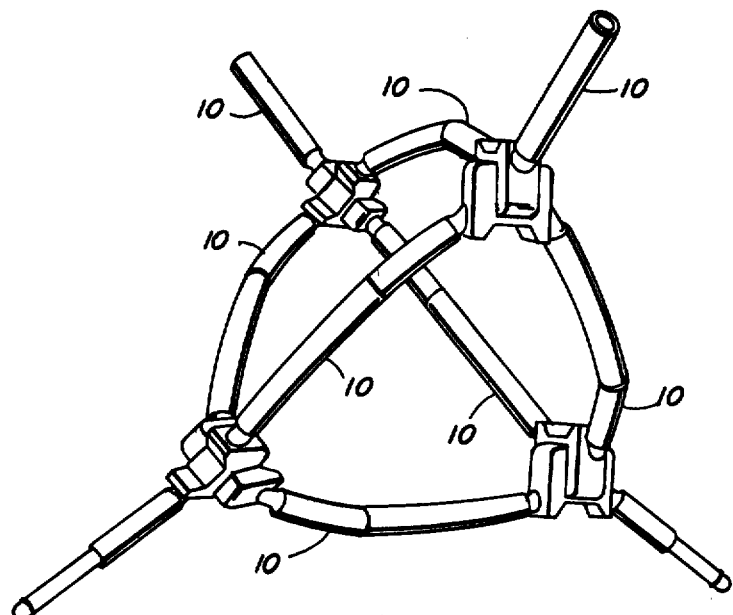
FIG. 12 is a perspective view of the tetrahedrane molecule utilizing interconnected and interlocked $sp^3$ model members.

Referring now to the drawings wherein the illustrations are for the purpose of describing the preferred embodiment of the invention and are not intended to limit the invention hereto, FIG. 1 shows a front plan view of a first molecular model member designated by the numeral 10. Member 10 is comprised of a U-shaped main portion 12, which represents the nucleus of an atom, from which emanate two arms 14 and 16, which represent the electron bonds of the atoms. Each of the arms 14 and 16 is generally circular in cross-section and positioned at an angle of 54° 44′ with respect to a plane perpendicular to the bottom surface of the U-shaped main portion 12 so that the total included angle between the arms 14 and 16 is 109° 28′. In an alternate embodiment illustrated in FIG. 3, the arms 14 and 16 are oppositely directed but the total included angle therebetween is 109° 28′. Because of the size of this included angle, which represents the bond angle, the member 10 represents what is known in organic chemistry as an sp$^3$ hybrid orbital of either carbon, nitrogen, or oxygen. Each of the respective bases 18, 20 of each of the arms 14, 16 is reduced in diameter at its intersection with the U-shaped main portion 12 of the member 10 to permit the arms 14, 16 to be flexibly movable relative to the main portion 12. Typically, the member 10 is injection molded from a polypropylene copolymer to make the member 10 flexible. The use of such a material in conjunction with the reduced diameter of the bases 18, 20 of the arms 14, 16 permits the arms 14, 16 to be sufficiently flexible with respect to the U-shaped main portion 12 of the member 10. Also, the use of such a material permits the member 10 to be color coded, for example, black can be used to designate a carbon atom, blue can be used for nitrogen atoms, and red can signify an oxygen atom. In addition, since these members 10 are injection molded, the type of bond they depict, e.g., sp$^3$, can be imprinted into the member for identification purposes.

The arm 14 is comprised of a first diameter portion 22 and a second diameter portion 24 having a smaller diameter than the first diameter portion 22 so as to form an annular shoulder 26 at the intersection thereof. An annular rib 28 is provided on the second diameter portion 24 at a predetermined distance from the annular shoulder 26. The end 30 of the second diameter portion 24 is rounded to ease insertion thereof into mating molecular model members hereinafter described.

A blind bore 32 is provided in the end 34 of the arm 16, as shown in FIG. 4. The blind bore 32 is comprised of an inner diameter portion 36 having a diameter approximately equal to the outer diameter of the annular rib 28 provided on the second diameter portion 24 of the arm 14, and an outer diameter portion 38 having a diameter slightly less than that of the inner diameter portion 36 so as to form an annular shoulder 40 at the intersection thereof. A flared surface 42 is provided at the entrance to the outer diameter portion 38 of the blind bore 32 to each the insertion of other mating molecular model members thereinto. The depth of the blind bore 32 exceeds the axial length of the second diameter portion 24 of the arm 14, permitting the total insertion of the second diameter portion 24 of one molecular member 10 into the blind bore 32 of another molecular member 10. In addition, the axial distance between the annular shoulder 26 and the annular rib 28 on the second diameter portion 24 of the arm 14 is slightly greater than the axial length of the outer diameter portion 38 of the blind bore 32 so that the annular rib 28 clears the annular shoulder 40 and is retained in the inner diameter portion 36 of the blind bore 32 when inserted thereinto. During the insertion process, the annular rib 28 frictionally engages the cylindrical wall defining the outer diameter portion 38 of the blind bore 32 and then "snaps" into the inner diameter portion 36 thereof as it clears the annular shoulder 40. This "snap action" prevents the molecular model members from accidently coming apart since the annular rib 28 must radially expand the annular shoulder 40 and the outer diameter portion 38 of the blind bore 32 in order to permit disassembly of the members. In addition, inasmuch as the outer diameter of the annular rib 28 is approximately equal to the diameter of the inner diameter portion 36 of the blind bore 32, the arm 14 of one molecular model member can rotate within the arm 16 of another molecular model member so that the proper relative orientation of each of the U-shaped main portions 12 thereof can be obtained. Furthermore, the total axial lengths of the arm 16 and the first diameter portion 22 of the arm 14 are such that when interconnected with the same or other molecular model members are representative of the relative distances between carbon atoms in molecules or compounds in the field of organic chemistry.

The U-shaped main portion 12 of the molecular model member 10 has an opening 44 therein, generally square in configuration, with side walls 46 and a bottom surface 48 generally parallel respectively to the side surfaces and the connecting transverse surface of the U-shaped main portion 12. Each of the ends of the side walls 46 is provided with an angular lead-in surface 50. An inwardly directed lip 52 is provided at the junction of each of the angular lead-in surfaces 50 with their respective side wall 46. The main portion 12 of the member 10 is also provided with a projection 54 substantially parallel to the bottom surface 48 of the opening 44. The base of the main portion 12, shown generally by the numeral 56, is substantially square in cross-section with overall dimensions generally equal to those of the side walls 46 and the bottom surface 48 of the opening 44. Because of the square configurations and dimensions of the base 56 of the main portion 12 and the opening 44 provided in same, two members 10 can be interlocked by positioning the two members perpendicularly with respect to one another so that the openings 44 are inwardly directed relative to one another. In this orientation the members 10 are brought together so that the opening 44 in each member 10 receives the base 56 of the main portion 12 of the other member 10, as shown in FIG. 5. When so connected, the bottom surfaces 48 of each of the openings 44 contact each other, and the inwardly directed lips 52 on each member 10 firmly engage the projection 54 on the other member 10 preventing the accidental disassembly of the members 10. In this manner, a molecule model can be formed wherein the central portion 58 as shown in FIG. 5, represents the nucleus and the arms 14 and 16 represent the electron bonds of the molecule.

From the foregoing it is apparent that any number of different models of molecules and compounds can be formed. For example, FIG. 5 illustrates a typical molecule having a tetrahedral structure. In this structure, the model members are dimensionally accurate for carbon-carbon bonding, however, it should be noted that when the member 10 is color coded red to signify oxygen or blue to depict nitrogen, the relative distances are less accurate than when member 10 is utilized to depict carbon. In either case, the resulting tetrahedral structure of the represented atoms illustrates the four electron pairs which surround divalent (dibonded) oxygen and trivalent (tribonded) nitrogen, respectively. Because of this, the resulting models remind the student and/or the model builder of the two non-bonded electron pairs for divalent oxygen and the one non-bonded electron pair for trivalent nitrogen. The two non-bonded electron pairs for oxygen can be used to illustrate oxonium salts which are trivalent (tribonded) oxygen, whereas the one non-bonded electron pair for nitrogen can depict ammonium salts which are tetravalent (tetrabonded) nitrogen. It should also be noted that where divalent oxygen is depicted in a model, only one member 10 (color coded red) is necessary, thus effectively doubling the number of oxygen atom models that can be formed.

To disassemble the resulting molecular model, the main portion 12 of one molecular member 10 is spread outwardly by applying a force to each of the arms 14, 16 thereof so as to increase the included angle therebetween. While this is occurring, a similar force is applied to the other member 10 which results in the disengagement of the inwardly directed lips 52 on each member 10 from the projection 54 on the other member 10. In this manner the two members 10 can be disassembled.

Referring now to FIG. 6, a front plan view of a second molecular model member, designated by the numeral 60, is shown. Model member 60 is very similar to model member 10 and those components thereof that are identical will be referred to by the same component members. Member 60 is comprised of a U-shaped main portion 12 from which emanate two arms 62 and 64 which have a shorter axial length than the arms 14 and 16 of the member 10. In addition, each of the arms 62 and 64 is positioned at an angle of 60° with respect to a plane perpendicular to the bottom surface of the U-shaped main portion 12 so that the total included angle between the arms 62 and 64 is 120°. Because of the size of this included angle, which represents the bond angle, the member 60 represents what is known in organic chemistry as an $sp^2$ hybrid orbital of carbon.

The arm 62 is proportionately shorter in axial length than the arm 14 of the member 10 in order to maintain relative proportionality between the bond lengths associated with the members 10 and 60. The shortening of the arm 62 is accomplished by reducing the axial length of the first diameter portion 66 thereof, while maintaining the axial length and diameter of the second diameter portion 68 equal to the axial length and diameter of the second diameter portion 24 of the arm 14. Similarly, the axial length of the arm 64 is proportionately shorter than the axial length of the arm 16 of the member 10 in order to maintain relative proportionality of the bond lengths. However, even though the axial length of the arm 64 is shorter than that of the arm 16, the blind bore 70 formed therein has the same depth and configuration as the blind bore 32 formed in the arm 16. Inasmuch as the axial lengths and diameters of the second diameter portion 24 and 68 of the respective arms 14 and 62 are equal, and since the depth and configuration of the blind bores 32 and 70 in the respective arms 16 and 64 are identical, the arms of these members 10 and 60 can be interconnected. In addition, the U-shaped main portion 12 of each of the members 10 and 60 is identical in overall size, configuration, and depth of the opening 44. This permits the main portions 12 of these members 10 and 60 to be interlocked as previously described for member 10. Thus, the same or dissimilar molecular model members can be interconnected through their arm portions and/or interlocked through their main portions 12 making these molecular model members universal.

The front plan view of a third molecular model member, designated by the numeral 80, is shown in FIG. 7. Here again, those components thereof that are identical to those components of the members 10 and 60 will be referred to by the same component members. Member 80 characterizes a double bond between two atoms and as such is composed of two U-shaped main portions 12 with their respective openings 44 directed inwardly toward each other and connected by two substantially parallel arms 82, the end of each of the arms 82 being connected to an end of the U-shaped main portion 12 adjacent the lead-in surface 50. The overall axial length of the double bond, which is measured between the bottom surfaces 48 of the U-shaped main portions 12 is proportional to the axial length of the arms 14, 16 and 62, 64 of the members 10, 60 respectively. Since the U-shaped main portion 12 is identical to the main portions 12 of the member 10 and 60, the member 80 can be interlocked with either or both of the members 10 and 60. When the member 10 is color coded red to signify oxygen and is interlocked with a U-shaped main portion 12 on one end of the member 80, and a black member 10 to depict carbon is interlocked with the main portion 12 on the other end of member 80, the resulting model depicts a carbon-oxygen double bond of carbonyl. It should be noted that the two color coded arms 14 and 16 depict non-bonded electron pairs such that intermediates in reactions can be depicted by interconnecting other molecular members to these arms. If a blue color coded member 10 is substituted for the red color coded member 10 in the above model, the resulting model represents a carbon-nitrogen double bond or imine. Here again, the two color coded arms 14 and 16 represent electron pairs which can be used in bonding to depict an immonium salt.

The front plan view of a fourth molecular model member, designated by the numeral 90, is shown in FIG. 8. As in the previous molecular model members, the components thereof that are identical to those components of the members 10, 60 and 80 will be referred to by the same component members. Member 90 characterizes a triple bond (alkyne) and is comprised of a main portion 92 having at one end thereof a shaft-like extension 94 with a diameter equal to that of the first diameter portions 22, 66 of the arms 14, 62, respectively, and a shaft-like extension 96 with a diameter equal to that of the arms 16, 64 of the member 10 and 60, respectively at the other end thereof. Each of the shaft-like extensions 94, 96 is reduced in diameter at its respective intersection 98, 100 with the main portion 92 to permit the extensions 94, 96 to be flexibly movable relative to the main portion 92. The shaft-like extension 94 is terminated in a cylindrical section 102 having a configuration, axial length, and diametric cross-section identical to that of the second diameter portions 24, 68 of the arms 14, 62, provided for model members 10 and 60, respectively. A blind bore 104 is provided in the end of the shaft-like extension 96 and has the same depth and configuration as the blind bores 30, 70 formed in the end of arms 16 and 64, respectively. Inasmuch as the cylindrical section 102 is identical in configuration, axial length, and diametric cross-section to the second diameter portions 24, 68 of the arms 14 and 62, and since the shaft-like extension 96 with the blind bore 104 therein is identical to the arms 16, 64 with the blind bores 30, 70, respectively therein, the molecular model member 90 can be interconnected with either or both of the model members 10 and 60. The overall dimensions of the member 90 are such that when so interconnected with these model members, relative proportionality of the bond lengths for carbon-carbon bonding is maintained.

In order to assist in the location of different atoms in an assembled molecular model, marker balls 106, as shown in FIG. 10, are provided. These marker balls 106 have a stepped bore 108 formed therein with a first diameter of sufficient size to receive the second diameter portions 24, 68 of the arms 14 and 62, respectively, and a second diameter of sufficient size to receive arms 16 and 64. As with the molecular model members 10 and 60, these marker balls 106 can be formed in different colors to depict different elements to be identified.

Figure 13:
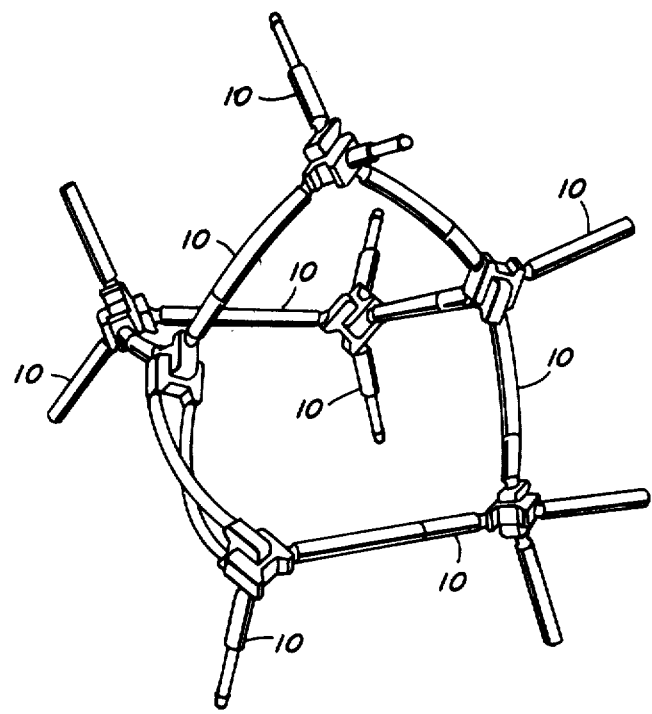
FIG. 13 is a perspective view of a molecular model utilizing the third molecular model member of the invention to depict a double bond in combination with other molecular model members of the invention and which illustrates the double bond member in a distorted configuration and the non-linearity of the other molecular bonds.
Figure 14:
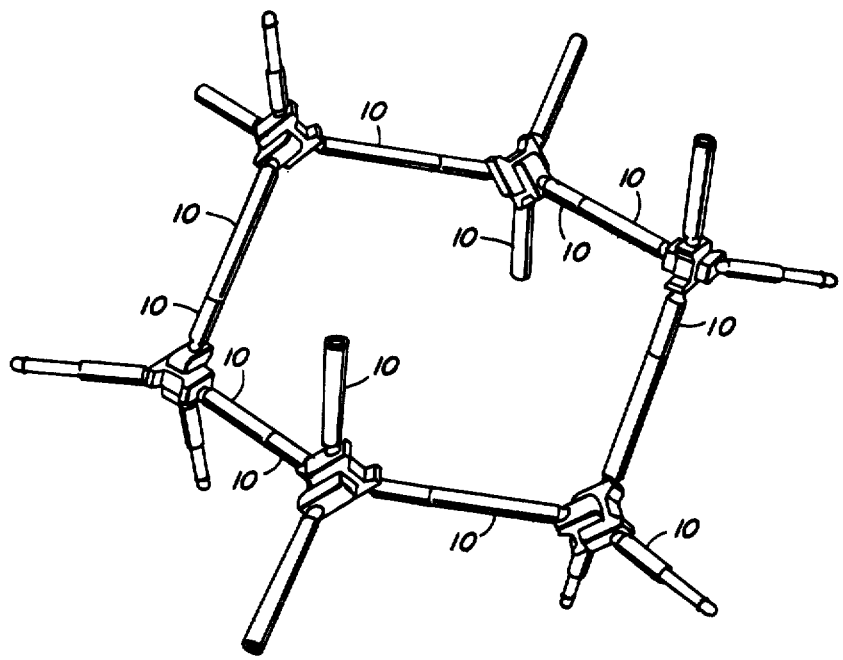
FIG. 14 is a perspective view of a six member ring consisting of interconnected $sp^3$ members and illustrating the six member ring in a non-strained chair configuration.

From the foregoing, it is apparent that the molecular model members disclosed offer a number of advantages over the prior art. The model members are dimensionally accurate for carbon-carbon bonds, are interlocking and yet can be easily disassembled, and are interchangeable. This interchangeability combined with the flexibility of the material utilized for the model members and the rotatability of the model members about the axes, permits the members to be interconnected and/or interlocked and rotated so that models of all known molecules and compounds in the field of organic chemistry can be assembled. For example, a model of a three member ring consisting of three interconnected sp³ members (member 10) can be formed, as shown in FIG. 11, or the model for tetrahedrane can be formed from sp³ members (member 10), as shown in FIG. 12. Similarly, theoretical models can be assembled to note the distortion and non-linearity of the bonds, as shown in FIG. 13, or the coplanar nature of the molecule or compound and the instability of same. The assembly of a six member ring, as shown in FIG. 14, permits a comparison with the three member ring shown in FIG. 11 to demonstrate the linearity of the bonds of the former ring, which is interpreted as a strain-free molecule, and the non-linearity of the latter which is interpreted as a strained molecule. In addition, the polypropylene copolymer material resists flexing sufficiently so that the six member ring will assume a chair configuration, illustrated in FIG. 14, or a boat configuration, but will resist the interconversion between the two configurations sufficiently to suggest the presence of an energy barrier between the two forms. After a model of an instable molecule or atom has been formed, model members can be added or subtracted from the model and/or the model members can be axially rotated about their arms to show how the addition or subtraction of members and/or the relative position of the atoms affects the stability of the molecules or compounds. In addition, because of the aforementioned flexibility of the model members, the number of different types of members is minimized. This flexibility also results in a very low breakage rate and a long service life for the model members. Furthermore, since the model members are injection molded from a relatively inexpensive material, the model members and model building sets made therefrom are readily affordable by most individuals who would be interested in same, such as students and the like.

Other advantages arise when the double bond molecular model member is considered. All prior art double bond model members, except those utilizing tubing, resisted twisting and thus models of some actual and theoretical molecules or compounds could not be constructed. Because of the flexible nature of the polypropylene copolymer material, the double bond molecular model member of this invention can be readily twisted and thus models of all actual and theoretical molecules utilizing a double bond can be formed as shown in FIG. 13. In addition, since the polypropylene copolymer material is a thermoplastic, permanent distortion can be introduced if so desired. Thus, two double bonds can be interlocked to form a model for an allene (cumulene) by cutting one of the arms of the double bond model member so that the other double bond model member can be inserted therethrough. After insertion, the arm that has been cut can be rejoined by the application of heat, and the base portions of the double bonds can be interlocked.

And lastly, since the model members and the marker balls are color coded, various different elements can be depicted and readily identified. In addition, inasmuch as the type of bond is imprinted on the model member during the injection molding process, the model members are readily identifiable making the selection of same a simple process.

Certain modifications and improvements will occur to those skilled in the art upon reading the foregoing description. It will be understood that all such improvements and modifications have been deleted herein for the sake of conciseness and readability but are properly within the scope of the following claims.

We claim:

1. A molecular model building member comprising a first end portion, a second end portion, and two arms connecting said first end portion and said second end portion, each of said two arms being substantially symmetrical about its longitudinal axis, said first end portion and said second end portion each having an opening formed therein to receive another molecular model building member to form a model of a molecule, each of said first and second end portions having a projection formed thereon oppositely directed from said opening formed therein, said opening being provided with inwardly extending lips at the entrance thereto for engagement with the projection provided on another molecular model building member to interlock with said another molecular model building member when received within the opening adjacent said inwardly extending lips.

* * * * *